Sept. 12, 1961 A. BEYNER ET AL 2,999,966
TIMEPIECE COMPRISING AN ELECTROMAGNETICALLY
MAINTAINED OSCILLATING REGULATOR
Filed May 13, 1959 2 Sheets-Sheet 1
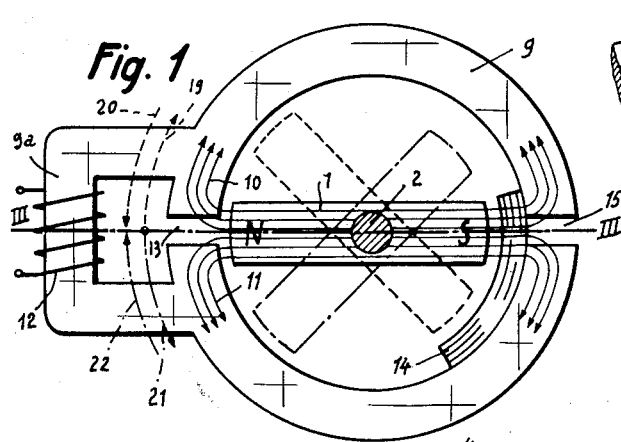
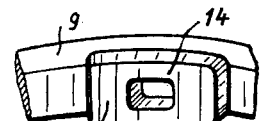
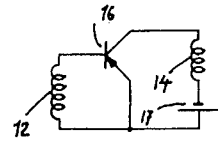
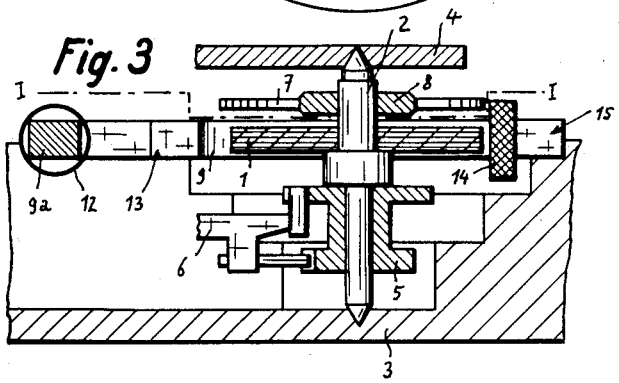
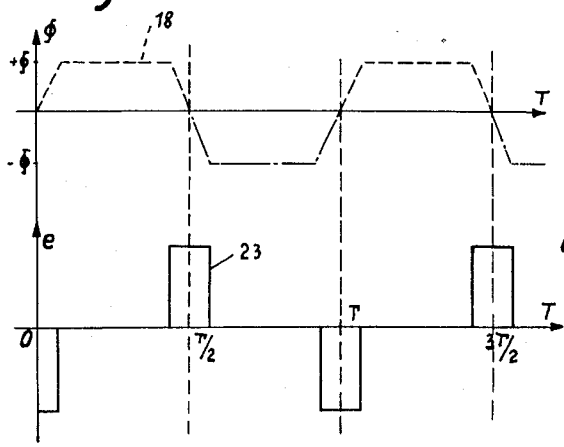
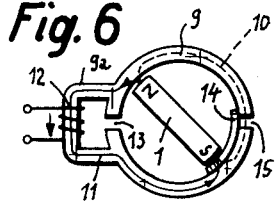
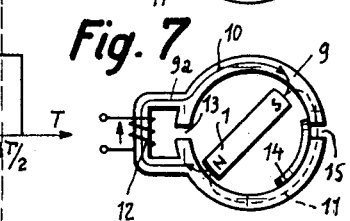
INVENTORS:
André BEYNER
René BESSON
By John B. ———
Attorney Sept. 12, 1961　　　A. BEYNER ET AL　　　2,999,966
TIMEPIECE COMPRISING AN ELECTROMAGNETICALLY
MAINTAINED OSCILLATING REGULATOR
Filed May 13, 1959　　　　　　　　　　2 Sheets-Sheet 2

INVENTORS
André BEYNER
René BESSON
By
　　　　　　Attorney

United States Patent Office 2,999,966
Patented Sept. 12, 1961

2,999,966
TIMEPIECE COMPRISING AN ELECTROMAGNETI-
CALLY MAINTAINED OSCILLATING REGULA-
TOR
André Beyner and René Besson, Neuchatel, Switzerland,
assignors to Ebauches S.A., Neuchatel, Switzerland, a
firm
Filed May 13, 1959, Ser. No. 812,841
11 Claims. (Cl. 318—132)

The present invention relates to a timepiece comprising an electromagnetically maintained oscillating regulator.

In timepieces of the type in which the movement of the regulating member produces by induction, in a pick-up winding, an impulse signal controlling the feed of a driving winding, the balance wheel generally supports a magnet which travels past the pick-up winding. The arrangement is such that, on passage of the magnet, the flux varies in the pick-up winding from a zero value to a maximum value and then returns to 0. This variation takes place twice per oscillation of the balance wheel. Since the induced voltage is a function of the derivative of the flux with respect to time, each variation of the latter produces a positive voltage and a negative voltage. Consequently, two impulse signals—due either to the positive voltages or to negative voltages—are supplied to the driving winding for each oscillation of the balance wheel. Now, from the viewpoint of isochronism, the maintenance of the balance wheel at the rate of two driving impulses per oscillation, one in each of the directions of its movement, is not generally favourable, since the Airy conditions are only approximately satisfied.

The proprietors of the present patent have already proposed a means of obviating this disadvantage while rendering possible the construction of an oscillating regulator device which is electromagnetically maintained at the rate of one driving impulse per oscillation. This solution forms the subject of Patent No. 2,946,940 (Appln. Serial No. 726,575). The object of the present invention is to improve the timepiece protected by the said patent, while further improving the effectiveness of the impulse signal induced in the pick-up winding, on the one hand, and on the other hand describing various driving devices which may be used in conjunction with the said pick-up winding.

The timepiece according to the present invention is characterised by an oscillating field magnet, by a tore or ring having high magnetic permeability, situated in the immediate neighbourhood of the said magnet and canalising its magnetic flux in such manner as to divide it into partial fluxes, the number of which is equal to the number of poles of the magnet, the said tore being open at at least one point, by a branch from the said tore, situated level with the said aperture, by a pick-up winding coiled around the said branch of the tore, and by a driving winding intended to maintain the oscillations of the magnet, the whole arrangement being such that, as long as the magnet is not situated opposite the aperture of the tore, the pick-up winding is washed by a constant magnetic flux, the value of which is equal to that of one partial flux, the said flux changing sign by passing through 0 when one pole of the magnet travels past the said aperture of the tore, whereby there is induced in the pick-up winding an impulse signal which controls the feed of the driving winding in such manner that the regulator thus receives a single driving impulse per complete oscillation of the magnet.

The accompanying drawings, in which only the parts necessary for an understanding of the invention has been illustrated, show by way of example a constructional form of the subject of the invention and modifications thereof.

FIGURE 1 is a plan view, partly in section along the line I—I of FIGURE 3, of the regulator device of a timepiece.

FIGURE 2 is a view in perspective of a detail of the said device.

FIGURE 3 is a section along the line III—III of FIGURE 1.

FIGURE 4 is a diagram illustrating the principle of the electric circuit of the timepiece.

FIGURE 5 is a diagram of the variations of the magnetic flux and of the voltage induced in the pick-up winding as a function of time.

FIGURES 6 and 7 are diagrammatic plan views of a part of the regulator device in two different positions of operation.

Figure 8:
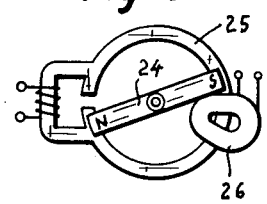
FIGURE 8 is a plan view of a detail of a variant.

The illustrated timepiece comprises a balance wheel 1, formed of a magnetised bar, of which the staff 2 is pivoted between the plate 3 of the movement, on the one hand, and the balance cock 4 on the other hand. Mounted on the staff 2 is a disc 5 controlling a counting pallet 6 intended to transform the oscillatory movements of the balance wheel 1 into a discontinuous rotary movement of a moving member (not shown) which is connected to the hands. The balance spring is designated by 7, its lower end being fixed to a collet 8.

The movement plate 3 supports a tore 9 consisting of a material having high magnetic permeability, which is coaxial with the balance wheel 1 and situated in its plane of oscillation. The said tore is intended to canalise the magnetic flux of the bipolar magnet 1 and to divide it into two half-fluxes, in accordance with the lines of force 10 and 11 indicated in FIGURE 1. A pick-up winding 12 surrounds a branch 9a of the tore, which branch is situated astride an aperture or slot 13 formed in the latter. A pancake driving winding 14 is applied against the inner face of the said tore, in the free space situated between the latter and the space swept by the magnet. This particular arrangement of the driving winding 14 avoids coupling between the input and the output of the amplifier hereinafter described. The position of equilibrium of the balance wheel has been shown in unbroken lines in FIGURE 1. The slot 13 is so located in the tore as to be situated opposite one of the poles of the magnet, in the present case the north pole, when the latter occupies its position of equilibrium. The driving winding 14 is then slightly offset in relation to the other pole. Finally, the tore 9 has a second aperture, designated 15, diametrically opposite the aperture 13.

The driving winding 14 is connected on the one hand to the collector of a transistor 16 and on the other hand to the negative terminal of a current source 17, for example a 1.3-volt battery (FIGURE 4). The positive terminal of the said current source 17 is in turn connected to the emitter of the transistor 16. Finally, the pick-up winding 12 is connected on the one hand to the base of the transistor and on the other hand to the emitter of the said transistor.

The operation of this timepiece is as follows:

When the balance wheel occupies its position of equilibrium (FIGURE 1), the flux Φ of the magnet is divided in equal parts 10 and 11 between the two halves of the tore. No flux flows in the branch and the coil 12 embraces zero flux. This position of the balance wheel corresponds to the point 0 of FIGURE 5 in which the curve 18 indicates the variation of the flux by which the winding 12 is washed. As soon as the bar leaves its position of equilibrium, one of the partial fluxes passes through the slot or aperture 15 in the tore, which constitutes an additional air gap reducing it considerably in favour of the other partial flux by which the pick-up winding 12 is at that moment being washed. Experience has shown that even if the slot 15 is of small width it produces between the partial fluxes a difference such that one of them comprises almost all the flux Φ of the magnet, while the other is reduced to an almost zero flux.

It will be assumed that the magnet is moving in the direction of the arrow 19 (FIGURE 1) from its position of equilibrium to the position of FIGURE 6, which corresponds to the position illustrated in chain lines in FIGURE 1. In this position, the partial flux 11 washing the winding 12 has a value substantially equal to Φ, which value is maintained until the instant when, on return of the magnet in the direction of the arrow 20, its north pole returns to a position opposite the aperture 13 in the tore. The flux passing through the bobbin then decreases again and passes through a zero value at the instant when the balance wheel occupies its position of equilibrium (T/2 in FIGURE 5). The balance wheel then moves in the direction of the arrow 21, and in the course of this movement it passes through the position of FIGURE 7, corresponding to the position illustrated in dash-dotted lines in FIGURE 1. The flux 10 washing the winding 12 then has a minimum value substantially equal to —Φ, which remains constant as long as the north pole of the magnet moves beyond the aperture 13. At the end of the complete oscillation (point T of FIGURE 5), and after the balance wheel has finally moved in the direction of the arrow 22, the flux has returned to a zero value. This variation of the flux produces, by induction, a voltage in the winding 12 in accordance with the law $$e = -n\frac{d\Phi}{dt}$$

represented by the curve 23 in FIGURE 5. This signal applied between the base and the emitter of the transistor 16 renders the latter conductive, so that the driving winding 14 is then fed by the source 17, whereby a driving impulse is applied to the balance wheel. Since only one of the voltages, the positive or the negative, is employed, it will be seen from the diagram of FIGURE 5 that the balance wheel receives only one driving impulse per oscillation. In the illustrated example, the winding 12 being situated exactly opposite the position of equilibrium of the north pole of the magnet, the driving impulse is symmetrically distributed on either side of the position of equilibrium of the balance wheel.

In the above-mentioned formula $$e = -n\frac{d\Phi}{dt}$$

$dt$ represents the time during which Φ varies, that is to say, the duration of the travel of the north pole of the magnet past the aperture 13 of the tore. This duration is very short. In the solution proposed in Patent No. 2,946,940. (Serial No. 726,575), the duration of $dt$ was longer, $dt$ corresponding to the duration of the passage of the north pole of the magnet past the pick-up winding situated directly on the tore, the latter having no aperture 13 and no branch 9a. In the present construction, $e$, and consequently the signal sent to the amplifier, are substantially improved. In addition, owing to the fact that the winding 12 is situated on a branch of the tore, it is possible to lengthen the north arm of the magnet in such manner as to minimise the air gap separating the north pole from the tore, whereby a considerable increase is produced in the useful magnetic flux. It should be noted that the amplitude of the oscillations of the balance wheel must not exceed a limit value such that the north pole never comes opposite the driving winding 14.

It is to be noted that, by increasing or decreasing the distance between the ends of the tore which define the gap 15, or by mounting the tore in a slightly eccentric position in relation to the magnet, it is possible to create an asymmetry of the magnetic field, which breaks the isochronism of the oscillations of the magnet. By this means, there is created a cause of directed anisochronism which permits of at least partially compensating for any defects in isochronism which may be present in the regulator device (balance wheel and hair spring) of the clockwork movement. The slot 15 could be dispensed with.

Figure 9:
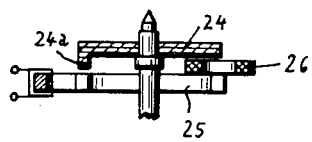
FIGURE 9 is a section.

In the variant of FIGURES 8 and 9, the magnet designated 24 is situated just above the tore 25, and not in the plane thereof, as in the first constructional form. The pancake driving coil 26 is situated on the tore, between the latter and the magnet. The north pole of the magnet has a boss 24a extending in the direction of the tore and intended to reduce the air gap. The operation is identical to that of the first constructional form.

Figure 10:
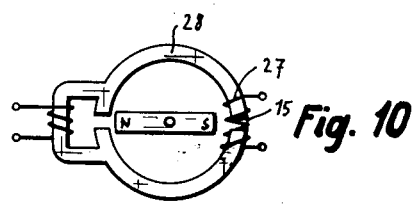
FIGURES 10 and 11 are plan views of a detail of two variants.

The variant of FIGURE 10 differs from the first constructional form by the fact that the driving coil designated 27 is not of pancake form, but is coiled around the tore 28, on either side of the slot 15 therein. All the strands of this coil which are situated in the air gap are driving strands, while in the first constructional form only the strands 14a of the coil 14 operate, the other strands occupying an unrequired space in the air gap.

Figure 11:
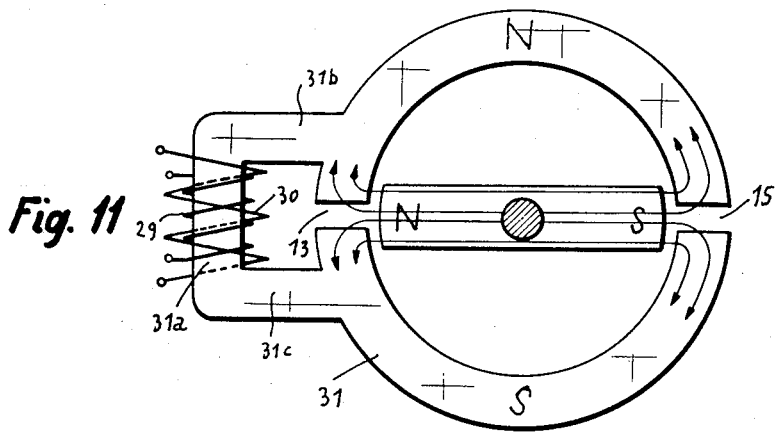

Finally, the variant of FIGURE 11 constitutes a polarised-magnet motor and not an electrodynamic motor like the previous constructional forms and variants. In this variant, the driving coil 29 and the pick-up winding 30 are both coiled on the branch 31a of the tore. The pick-up and driving coils may be juxtaposed, imbricated or superimposed on the same portion of the magnetic circuit. It will be observed that the two coils are thus strongly coupled. In addition, the dimension of the coils no longer depends upon the air gaps, since they are both on the branch of the tore. Finally, in this variant, the amplitude of the oscillations is not limited by the dimensions of the driving coil, as is the case when the latter is situated in the neighbourhood of the position of equilibrium of the south pole of the magnet, but is limited to a value of 180° less half the width of the slot or aperture 13 and less half the width of the magnet.

The operation of this variant is as follows:

When the transistor is rendered conductive by the negative impulse produced in the pick-up winding 30, the driving winding 29 constitutes, with the tore 31, an electromagnet. The slots 13 and 15 must be sufficiently wide to prevent the magnetic field from being closed, so that the tore has a south branch and a north branch. The couple lasts as long as the impulse lasts. In the other direction, there is no driving impulse, because the control circuit of the transistor receives an impulse of positive direction.

A variant may be provided in which the driving coil and the pick-up coil may both be disposed one behind the other on the branch of the tore, without being superimposed, for example one on the portion 31b of the said branch and the other on the portion 31c.

What we claim is:

1. In a timepiece having an electromagnetically maintained oscillating regulator member, an oscillating field magnet, a ring having high magnetic permeability, situated in the immediate neighbourhood of the said magnet and canalising its magnetic flux in such manner as to divide it into partial fluxes, the number of which is equal to the number of poles of the magnet, the said ring being open at at least one point, a branch from the said ring, facing the said aperture, a pick-up winding coiled around the said branch of the ring, and a driving winding, situated in the area swept by the said magnetic flux when the said magnet oscillates, and intended to maintain the oscillations of the said magnet, the whole arrangement being such that, as long as the magnet is not situated opposite the aperture of the ring, the pick-up winding is washed by a constant magnetic flux, the value of which is equal to that of one partial flux, the said flux changing sign by passing through zero when one pole of the magnet travels past the said aperture of the ring, whereby there is induced in the pick-up winding an impulse signal which controls the feed of the driving winding in such manner that the regulator thus receives a single driving impulse per complete oscillation of the magnet.

2. In a timepiece having an electromagnetically maintained oscillating regulator member, an oscillating field bipolar magnet, a ring having high magnetic permeability, situated in the immediate neighbourhood of the said magnet and canalising its magnetic flux in such manner as to divide it into partial fluxes, the number of which is equal to the number of poles of the magnet, the said ring being open at two points diametrically opposite one another, a branch from the said ring, facing one of the said apertures, a pick-up winding coiled around the said branch of the ring, and a driving winding, situated in the area swept by the said magnetic flux when the said magnet oscillates, and intended to maintain the oscillations of the said magnet, the whole arrangement being such that, as long as the magnet is not situated opposite the apertures of the ring, the pick-up winding is washed by a constant magnetic flux, the value of which is equal to that of one of the partial fluxes, which fluxes have appreciably unequal values, one of them being reduced in favour of the other by the additional air gap formed by the second aperture of the ring, the said flux changing sign by passing through zero when one pole of the magnet travels past the said aperture of the ring, whereby there is induced in the pick-up winding an impulse signal which controls the feed of the driving winding in such manner that the regulator thus receives a single driving impulse per complete oscillation of the magnet.

3. In a timepiece having an electromagnetically maintained oscillating regulator member, an oscillating field magnet consisting of a magnetised bar, a ring having high magnetic permeability, situated in the immediate neighbourhood of the said magnet, in its rotation plane, and canalising its magnetic flux in such manner as to divide it into partial fluxes, the number of which is equal to the number of poles of the magnet, the said ring being open at at least one point, a branch from the said ring, facing the said aperture, a pick-up winding coiled around the said branch of the ring, and a driving winding, situated in the area swept by the said magnetic flux when the said magnet oscillates, and intended to maintain the oscillations of the said magnet, the whole arrangement being such that, as long as the magnet is not situated opposite the aperture of the ring, the pick-up winding is washed by a constant magnetic flux, the value of which is equal to that of one partial flux, the said flux changing sign by passing through zero when one pole of the magnet travels past the said aperture of the ring, whereby there is induced in the pick-up winding an impulse signal which controls the feed of the driving winding in such manner that the regulator thus receives a single driving impulse per complete oscillation of the magnet.

4. In a timepiece having an electromagnetically maintained oscillating regulator member, an oscillating field magnet, consisting of a magnetised bar, a ring having high magnetic permeability, situated immediately under the said magnet and canalising its magnetic flux in such manner as to divide it into partial fluxes, the number of which is equal to the number of poles of the magnet, the said ring being open at at least one point, a branch from the said ring, facing the said aperture, a pick-up winding coiled around the said branch of the ring, and a driving winding, situated in the area swept by the said magnetic flux when the said magnet oscillates, and intended to maintain the oscillations of the said magnet, the whole arrangement being such that, as long as the magnet is not situated opposite the aperture of the ring, the pick-up winding is washed by a constant magnetic flux, the value of which is equal to that of one partial flux, the said flux changing sign by passing through zero when one pole of the magnet travels past the said aperture of the ring, whereby there is induced in the pick-up winding an impulse signal which controls the feed of the driving winding in such manner that the regulator thus receives a single driving impulse per complete oscillation of the magnet.

5. In a timepiece having an electromagnetically maintained oscillating regulator member, an oscillating field magnet, consisting of a magnetised bar, a ring having high magnetic permeability, situated in the immediate neighbourhood of the said magnet, in its rotation plane, and canalising its magnetic flux in such manner as to divide it into partial fluxes, the number of which is equal to the number of poles of the magnet, the said ring being open at at least one point, a branch from the said ring, facing the said aperture, a pickup winding coiled around the said branch of the ring, and a driving winding intended to maintain the oscillations of the magnet, said driving winding consisting of a pancake coil situated closely applied against the said ring, the whole arrangement being such that, as long as the magnet is not situated opposite the aperture of the ring, the pick-up winding is washed by a constant magnetic flux, the value of which is equal to that of one partial flux, the said flux changing sign by passing through zero when one pole of the magnet travels past the said aperture of the ring, whereby there is induced in the pick-up winding an impulse signal which controls the feed of the driving winding in such manner that the regulator thus receives a single driving impulse per complete oscillation of the magnet.

6. In a timepiece having an electromagnetically maintained oscillating regulator member, an oscillating field magnet, consisting of a magnetised bar, a ring having high magnetic permeability, situated immediately under the said magnet and canalising its magnetic flux in such manner as to divide it into partial fluxes, the number of which is equal to the number of poles of the magnet, the said ring being open at at least one point, a branch from the said ring, facing the said aperture, a pick-up winding coiled around the said branch of the ring, and a driving winding intended to maintain the oscillations of the magnet, said driving winding consisting of a pancake coil situated closely applied against the said ring, the whole arrangement being such that, as long as the magnet is not situated opposite the aperture of the ring, the pick-up winding is washed by a constant magnetic flux, the value of which is equal to that of one partial flux, the said flux changing sign by passing through zero when one pole of the magnet travels past the said aperture of the ring, whereby there is induced in the pick-up winding an impulse signal which controls the feed of the driving winding in such manner that the regulator thus receives a single driving impulse per complete oscillation of the magnet.

7. In a timepiece having an electromagnetically maintained oscillating regulator member, an oscillating field magnet, a ring having high magnetic permeability, situated in the immediate neighbourhood of the said magnet and canalising its magnetic flux in such manner as to divide it into partial fluxes, the number of which is equal to the number of poles of the magnet, the said ring being open at at least one point, a branch from the said ring, facing the said aperture, a pick-up winding coiled around the said branch of the ring, and a driving winding intended to maintain the oscillations of the magnet, said driving winding being coiled around the ring, at a point diametrically opposite to the aperture of the ring, the whole arrangement being such that, as long as the magnet is not situated opposite the aperture of the ring, the pick-up winding is washed by a constant magnetic flux, the value of which is equal to that of one partial flux, the said flux changing sign by passing through zero when one pole of the magnet travels past the said aperture of the ring, whereby there is induced in the pick-up winding an impulse signal which controls the feed of the driving winding in such manner that the regulator thus receives a single driving impulse per complete oscillation of the magnet.

8. In a timepiece as claimed in claim 2, the feature that the driving winding is also coiled around the branch of the ring in such manner as to form a polarised-magnet motor.

9. In a timepiece as claimed in claim 2, the feature that the driving winding and the pick-up winding are superimposed.

10. In a timepiece as claimed in claim 2, the feature that the driving winding and the pick-up winding are each situated on a different section of the branch of the ring.

11. In a timepiece as claimed in claim 1, wherein the oscillating regulating member and the magnet are fast with one another, the feature that the said ring is disposed in a slightly asymmetrical fashion in relation to the axis of rotation of the magnet, this asymmetry breaking the isochronism of the regulator, whereby it is possible to compensate at least partially for any other causes of anisochronism.

References Cited in the file of this patent

UNITED STATES PATENTS 2,769,946     Brailsford _____ Nov. 6, 1956

FOREIGN PATENTS 1,092,411     France _____ Nov. 10, 1954